United States Patent
Morton et al.

(10) Patent No.: US 6,381,328 B1
(45) Date of Patent: Apr. 30, 2002

(54) ETSI INTELLIGENT NETWORK CAPABILITY SET 1 INTELLIGENT NETWORK APPLICATION PROTOCOL SERVICE SWITCHING POINT FINITE STATE MACHINE

(75) Inventors: Edward Morton, Oswego; Patricia Diane Polsley, Warrenville; Constantine Nicholas Tsioras, Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/056,402

(22) Filed: Apr. 7, 1998

Related U.S. Application Data

(60) Provisional application No. 60/057,547, filed on Aug. 29, 1997.

(51) Int. Cl.[7] ................................................ H04M 7/00
(52) U.S. Cl. ........................... 379/221.08; 379/221.09; 379/221.12; 379/221.11; 712/232
(58) Field of Search ............................. 379/88.2, 127, 379/156, 201, 221.08, 221.09, 221.12, 229; 326/37, 46; 709/227, 230; 370/352; 710/105; 712/220, 232

(56) References Cited

U.S. PATENT DOCUMENTS

| | | | |
|---|---|---|---|
| 5,265,216 A | * 11/1993 | Murphy et al. | 710/105 |
| 5,426,694 A | * 6/1995 | Hebert | 379/242 |
| 5,623,680 A | * 4/1997 | Flora-Holmquist et al. | 712/232 |
| 5,680,552 A | * 10/1997 | Netravali et al. | 709/250 |
| 5,838,768 A | * 11/1998 | Sumar et al. | 379/88.14 |
| 6,038,309 A | * 3/2000 | Ram et al. | 379/229 |

FOREIGN PATENT DOCUMENTS

| | | | |
|---|---|---|---|
| EP | 0781057 A2 | * 12/1996 | |
| JP | H03-178245 | 8/1991 | H04L/29/06 |
| WO | WO 95/10912 | 4/1995 | H04L/29/06 |

* cited by examiner

Primary Examiner—Ahmad F. Matar
Assistant Examiner—Bing Bui
(74) Attorney, Agent, or Firm—Charles L. Warren

(57) ABSTRACT

A finite state machine that implements the ETSI Intelligent Network Capability Set 1 for INAP protocol using a first finite state machine connected to a second finite state machine. To accomplish this implementation, the first finite state machine receives inputs and makes initial state transition choices. Once the first finite state machine has made an initial choice, the second finite state machine checks to see if the first finite state machine has transitioned to the appropriate state and, if it has not, give feedback to the finite state machine to the appropriate state. Once the appropriate state is reached, the outputs of the first finite state machine are valid and available. The finite state machines may be realized as physical logical devices or virtually using VFSM technology.

8 Claims, 4 Drawing Sheets

ETSI INTELLIGENT NETWORK CAPABILITY SET 1 INTELLIGENT NETWORK APPLICATION PROTOCOL SERVICE SWITCHING POINT FINITE STATE MACHINE

CROSS-REFERENCE TO RELATED APPLICATION

This application claims priority of Provisional Application Serial No. 60/057,547 which was filed Aug. 29, 1997.

BACKGROUND

The invention relates to telecommunication intelligent network protocols and more particularly to a finite state machine providing such intelligent network protocols.

An Intelligent Network utilizes a set of call-handling and call-routing features to provide the building blocks to create services customized to the needs of subscribers—business organizations, government agencies and individual end users. Some of the popular IN services are Advanced Free-Phone (customers call service subscribers at specified "1-800" numbers free of charge), Universal Number (service subscribers can advertise a single telephone number for callers to dial from any location in the country), Virtual Private Network (the same functions available through private networks are offered using facilities of the PSTN—Public Switched Telephone Network), Televoting (subscribers can survey public opinion using the PSTN), Calling Card (customers can place calls from any standard telephone to any destination with costs charged to the account specified by the calling card number) and Personal Number (remote call forwarding for subscribers who move frequently among locations).

There are five network elements that constitute an Intelligent Network:

The Service Control Point (SCP)

The SCP is the core of the IN. It contains the centralized database that stores service subscriber profiles, service information and call processing information.

The Service Switching Point (SSP)

The SSP recognizes an incoming IN call and "queries" the SCP for further instructions. The SSP then provides network switching functionality, based on the instructions received from the SCP.

The Intelligent Peripheral (IP)

The IP offers capabilities such as customized recorded announcements, digit collection and speech recognition. The IP can be integrated within the SSP or it can be standalone, i.e. external to the SSP.

The Service Management System (SMS)

The SMS gives network providers and service subscribers access to the Service Control Point (SCP) and also manages all intelligent network service and subscriber related data.

The Service Creation Environment (SCE)

The SCE enables network providers to create and introduce new services by building a decision tree that specifies the new service.

There are several standardization bodies for Intelligent Network . the American National Standards Institute (ANSI), the European Telecommunication Standards Institute (ETSI) and the International Telecommunications Union (ITU, formerly known as CCITT). ANSI provides US contributions, ETSI provides contributions from Europe and from other ETSI member countries. ITU serves as the world-wide standardization body, receiving input from ANSI, ETSI and other member countries that are members of neither of these two regional bodies. ITU defines Intelligent Network standards in "Capability Sets". The first approved phase of ITU IN standards was Capability Set 1, also known as CS-1. CS-1 supports a multi-vendor environment for SSP and SCP network elements.

The IN standards define an intelligent network in terms of Functional Entities (FEs) which provide certain functionality within a Physical Entity (PE). With regards to the Intelligent Network configuration shown in FIG. 1, there are three Physical Entities for which Functional Entities have been defined. These PEs are the SSP, the SCP and the IP.

The SSP Physical Entity which consists of several Functional Entities. The Call Control Function (CCF) FE provides call/service processing and control. The CCF FE establishes, manipulates and releases calls/connections. The Service Switching Function (SSF) FE, in association with the CCF FE, provides the set of functions required for interaction between the CCF FE and the Service Control Function (SCF) FE which is part of the SCP PE. The Specialized Resource Function (SRF) FE provides the specialized resources required for the execution of IN provided services (e.g. digit receivers, announcements, conference bridges, etc.). Note that the SRF FE can be integrated within the SSP PE or it can be external to the SSP PE. The SSP PE has either single interactions with other PEs, in which case the Single Association Control Function (SACF) provides a coordination-ordination function, or it has multiple coordinated interactions with other PEs, in which case the Multiple Association Control Function (MACF) provides the coordination function.

In order to communicate with the SCP, the SSP uses a protocol stack. On top of the stack is the Intelligent Network Application Protocol (INAP) which is the application or user part. This is the protocol that is used to define IN services. INAP utilizes the Transaction Capabilities Application Part (TCAP), which is the protocol that provides the capability to exchange messages between the SSP and the SCP. This message exchange between SSP and SCP is called a TCAP Dialogue. TCAP, in turn, lies on top of the Signaling Connection Control Part (SCCP) which is the protocol employed for addressing the Physical Entity with which a dialogue is required. Finally, SCCP uses the Message Transfer Part (MTP) which is responsible for the physical connections between Physical Entities.

As mentioned previously, the user protocol for communication between the SSP and the SCP for Intelligent Network calls is the Intelligent Network Application Protocol (INAP). ETSI has defined its version of the ITU INAP Capability Set 1 in its European Telecommunication Standard (ETS) 300 374-1 document.

Thus, there is a need in the art to provide an implementation of the INAP protocol, also known as ETSI INAP for a 5ESS-2000® switch in an SSP offering for the Intelligent Network. 5ESS and 5ESS-2000 are trademarks of Lucent Technologies Inc.

SUMMARY

Briefly stated in accordance with one aspect of the invention, the aforementioned need is provided by a finite state machine implementation of the ETSI INAP protocol, especially an implementation on the 5ESS-2000 SSP.

In accordance with one aspect of the invention, the aforementioned need is fulfilled by a finite state machine that provides ETSI INAP capability set 1 intelligent network application protocol which includes a first finite state machine and a second finite state machine connected to said first finite state machine.

In accordance with a specific embodiment of the invention, the aforementioned need is fulfilled by a finite state machine that provides ETSI INAP capability set 1 intelligent network application protocol which includes a first finite state machine and a second finite state machine connected to said first finite state machine. The first finite state machine provides each transition between states in response to input data. After the first finite state machine has provided a transition to a state, the second finite state machine is given control and determines if the state to which the first finite state machine has transitioned is the appropriate state and causes the first finite state machine to transition to the appropriate state if the first finite state machine had previously transitioned to a state other than the appropriate state.

DETAILED DESCRIPTION

Figure 1:
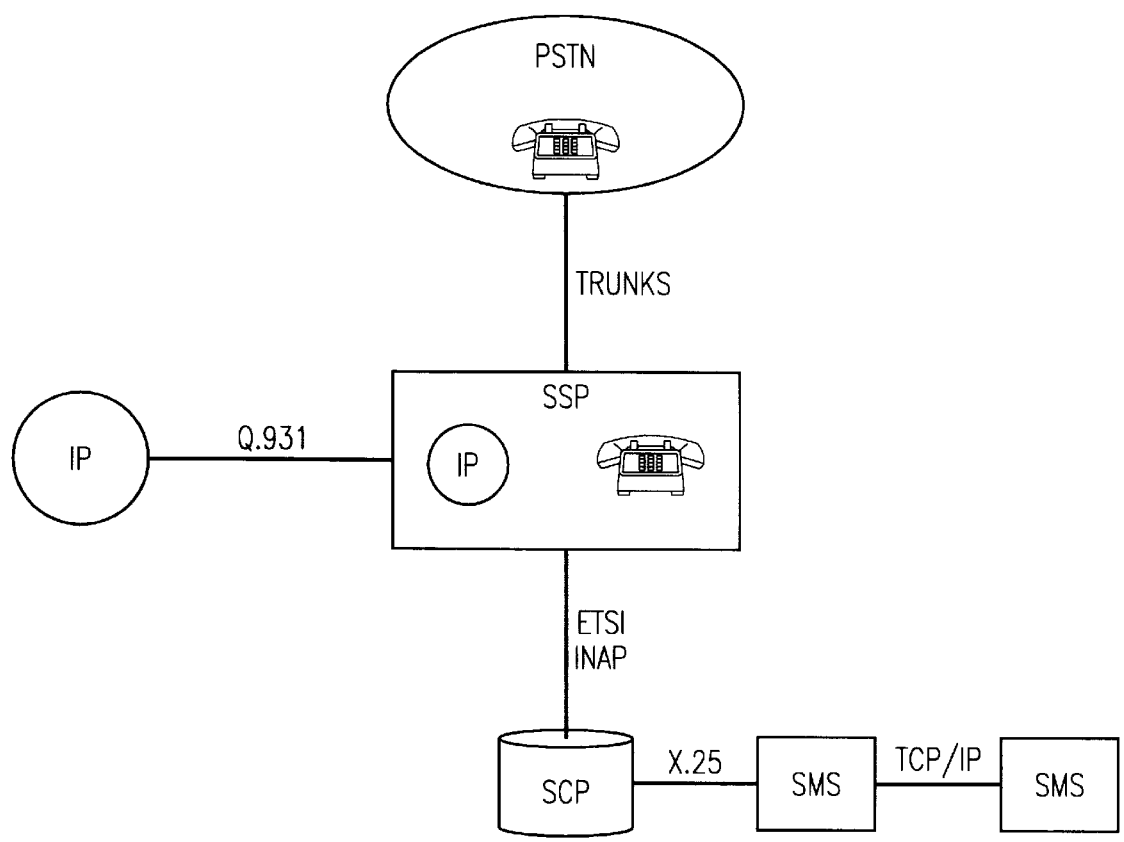
FIG. 1 is a block diagram of an Intelligent Network Configuration useful for discussing the invention.
Figure 2:
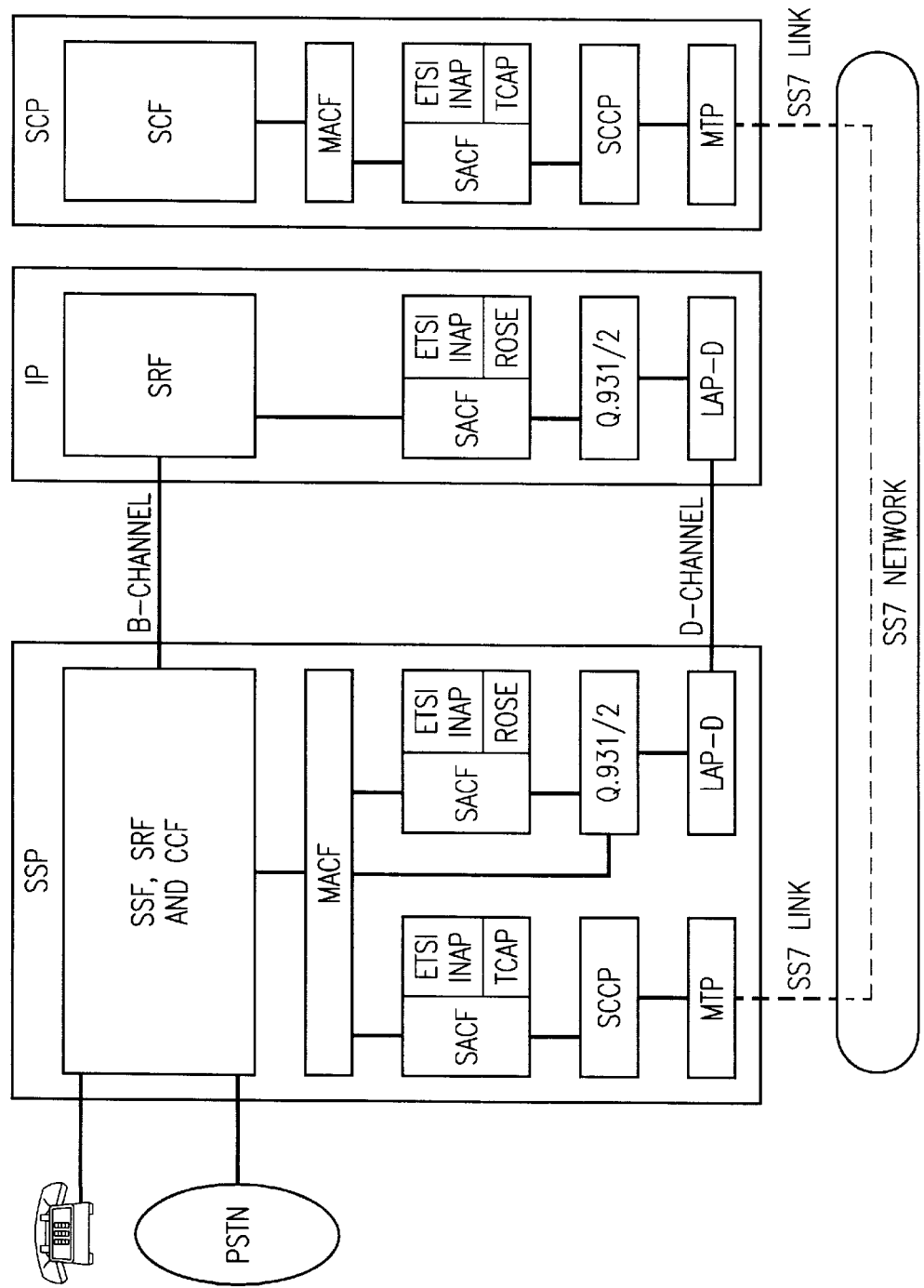
FIG. 2 is a block diagram of an example IN configuration showing the Functional Entities within the SSP, SCP and External IP Physical Entities.
Figure 3:
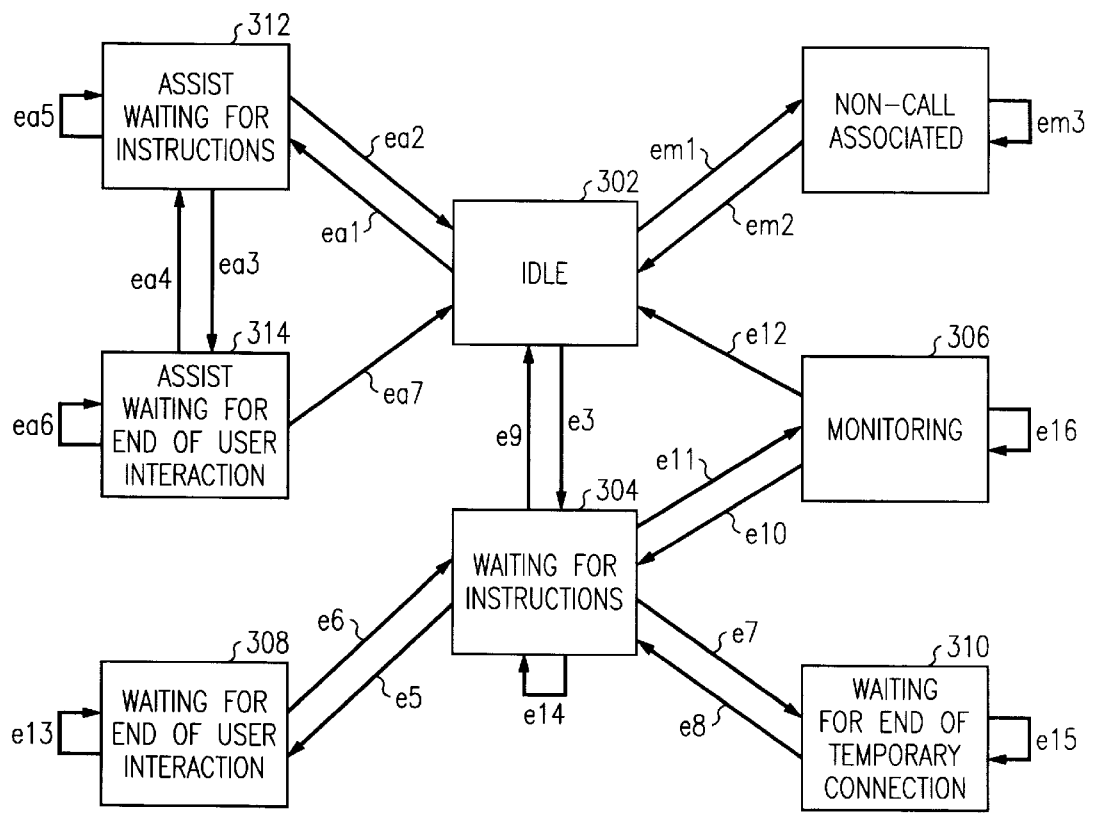
FIG. 3 is a state transition diagram of SSP ETSI INAP CS-1 FSM State Transitions.

Referring to FIG. 3, a general ETSI INAP Finite State Machine is shown. A common means to implement a communication protocol is to use a Finite State Machine (FSM). According to the ETS 300 374-1 recommendation, the ETSI INAP Finite State Machine 300 on the SSP consists of the following states:

Idle 302 is the initial and final state of the SSP FSM 300. The SSP FSM 300 is in the Idle state 302 prior to an IN call being detected. SSP FSM 300 returns to this state when the dialogue with the SCP has been completed.

Waiting for Instructions 304 is the state in which the SSP FSM 300 is waiting for an instruction from the SCP. Call handling is suspended and an application timer is set during Waiting for Instructions state 304 in order to avoid excessive suspension.

Monitoring 306 is the state in which the SSP FSM 300 is monitoring for certain call processing events. When one or more of these events are encountered, the SSP reports the event(s) to the SCP.

Waiting for End of User Interaction 308 is the state in which the SSP FSM 300 enters when the SCP requests from the SSP to connect to an IP so that recorded announcement and digit collection capabilities can be provided to the caller.

Waiting for End of Temporary Connection 310 is the state in which the SSP FSM 300 enters when the SCP requests the SSP to connect to another SSP, so that the second ("assisting") SSP will connect to an IP in order to provide recorded announcement and digit collection capabilities to the caller. This occurs when the first SSP does not have a physical connection to an IP (temporarily or permanently), or when the first SSP is connected to an IP that does not have the appropriate announcements required for the service. The Waiting for End of Temporary Connection state 310 is entered by the FSM 300 of the first SSP, while it is being "assisted" by another SSP.

Assist Waiting for Instructions 312 is the state which is equivalent to the Waiting for Instructions state 304 but it is entered by the "assisting" SSP FSM (not shown).

Assist Waiting for End of User Interaction 314 is the equivalent to the Waiting for End of User Interaction 308 state but it is entered by the "assisting" SSP FSM (not shown).

Non-call Associated Treatment 316 is the state in which the SSP FSM enters this state when there is a dialogue with the SCP that is not associated with a call.

ETS 300 374-1 also defines the set of state transitions for the SSP ETSI INAP FSM 300 which are shown in FIG. 3 as follows:

em1, em2 and em3 are state transitions relating to the part of the FSM that deals with SSP-SCP dialogues that are not associated with a phone call.

e3, e5, e6, e7, e8, e9, e10, e11, e12, e13, e14, e15 and e16 are state transitions relating to the part of the FSM that handles SSP-SCP dialogues that are associated with a phone call.

ea1, ea2, ea3, ea4 and ea5 are state transitions relating to the part of the FSM that is invoked when the SSP is assisting another SSP to connect to an IP.

Figure 4:
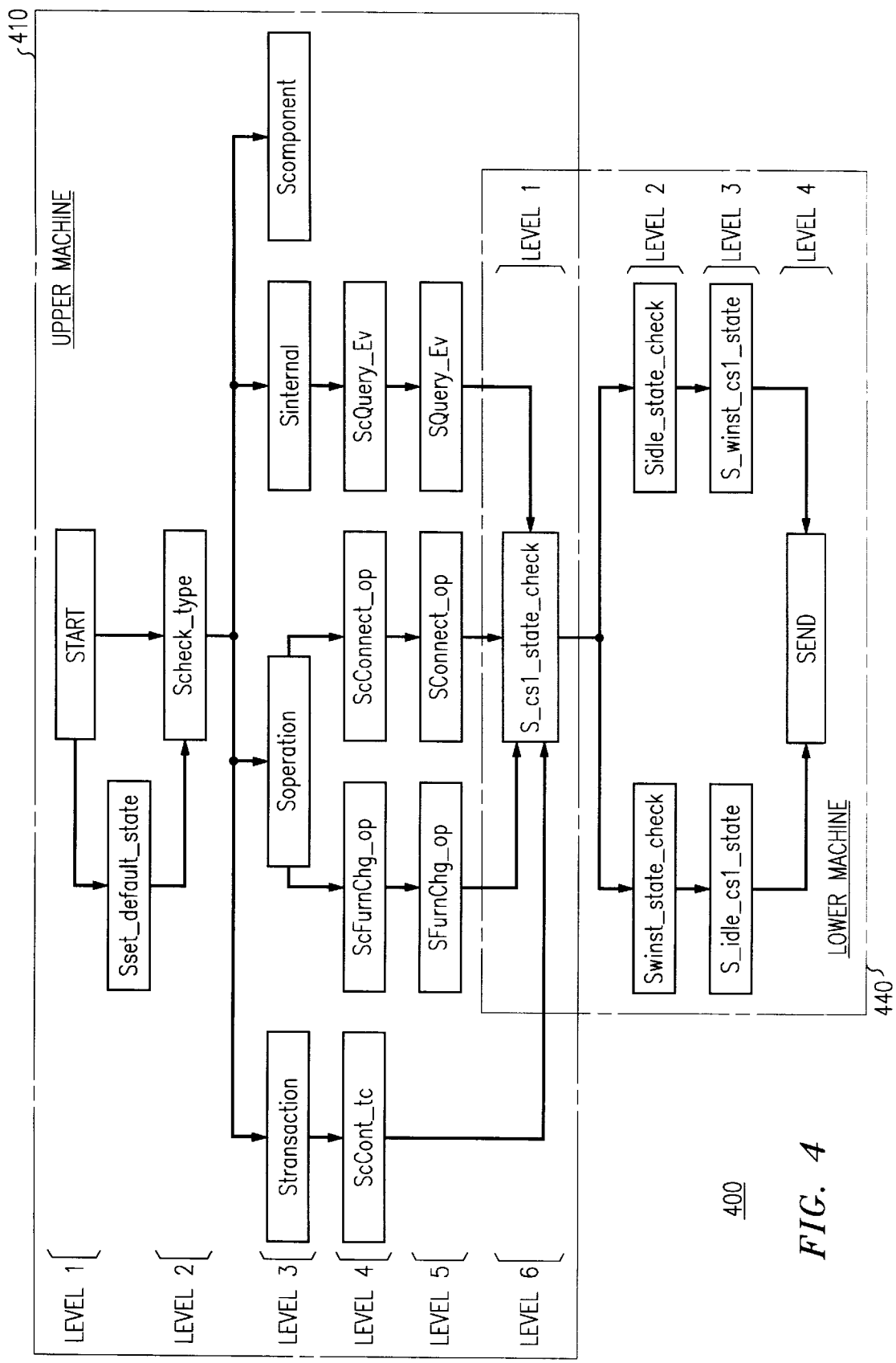
FIG. 4 is a block diagram of an FSM according to the present invention.

Referring now to FIG. 4, the ETSI INAP Protocol Implementation on the 5ESS-2000 SSP will be described. The 5ESS-2000 SSP implementation includes a Virtual Finite State Machine Technology to develop a Finite State Machine for ETSI-INAP protocol. Many design alternatives were considered during the design phase of the ETSI INAP CS-1 FSM 400 state machine for the 5ESS-2000 SSP. Since the VFSM technology provides simulation tools, it was relatively straightforward to verify these designs as the designs were produced. During the early phases of design, the design alternatives were simulated, including a design that copied the state machine as defined in the standards. This state machine is shown in FIG. 3. A state was defined for every state that was defined in the ETSI INAP CS-1 document. At first, the design of FIG. 3 seemed simple and straight forward because it represented the standards, exactly. However, after much simulation it became evident that using this scheme created a very complicated implementation. The Input Action section of each state was complicated because many of the incoming events could be accepted in multiple states. The Next State section of each state was equally complicated. This design resulted in repeated and redundant checks on inputs. It became evident that this scheme would not result in a flexible design which could be updated easily.

The FSM 400 which has been actually implemented according to the present inventor and is the preferred implementation is a hierarchical model with two logical finite state machines. There is only one control specification with a separation of control between the two logical machines. In this model of a FSM there is an "upper" machine 410, which processes inputs as they are received and there is a "lower" machine 440 that determines if the processing which was done in the "upper" machine should cause a transition to a new "CS1 state". The "CS1 states" are the states as defined by ETSI INAP CS-1.

The states in the implemented FSM 400 do not directly correspond to the ETSI INAP CS-1 defined states. Instead, the states are based on events. Each iteration of the ETSI INAP FSM machine begins with the "start" state and ends with the "end" state. The "upper" machine 410 contains six levels of states. These levels will be explained with an example given below. The ETSI INAP CS-1 states are represented by inputs. There is a input defined for each of the ETSI INAP CS-1 states shown in FIG. 3.

For the FSM 400, each of the incoming events was classified into one of four categories. Each event has at least two inputs associated with it, one that uniquely identifies the event and the other to identify the category of the event. State transitions are done in the "upper" machine 410 as the inputs are processed. Each of the states in the "upper" machine 410 are cohesive and are de-coupled from the other states. An input in the Input Register that causes a state transition to a state in the "upper" machine 410 can be cleared upon entering that state. The outputs in the "upper" machine 410 are the outputs that map to "real world behavior" such as sending messages (both internal to the switch and external switch messages), playing announcements, updating data, etc.

After the "upper" machine 410 of the model FSM completes its processing, it transitions to a state that is common to both machines. The "lower" machine is then given control and determines if the processing which was done in the "upper" machine 410 should cause a transition to a different "CS1 state". The definitions for state transitions in ETS 300 374-1 are implemented in the "lower" machine 440. There are four levels of states in the "lower" machine 440. The outputs in the "lower" machine 440 result in feedback events that insert the proper input representing the current ETSI INAP CS-1 state.

One example of the ETSI INAP CS-1 5ESS-2000 FSM State Machine is shown in FIG. 4. FIG. 4 illustrates the ETSI INAP CS-1 5ESS-2000 FSM state machine 400, including the different levels of the "upper" machine 410 and "lower" machine 440.

There is only one state in Level I of the "upper" machine 410 and that is the Start state. This is always the entry state of the ETSI INAP FSM. When the Call Control Function of the SSP determines that the SCP needs to be "queried" for this call, Call Control sends an intra-SSP message to ETSI INAP. This message is translated into a event by the interface function, the input mapper is called to map the event to input(s), and control is then given to the ETSI INAP FSM. The Start state is entered and if there is no input in the Input Register that indicates the CS-1 state, then the state Sset_default_state is entered. This state is an intermediate state between Levels 1 and 2. It will put Idle in the Input Register and will transition to the state in Level 2, Scheck_type.

Level 2 of the "upper" machine 410 has only one state, Scheck_type. As stated previously, each event is categorized into one of four categories. Each of these categories corresponds to a state (Stransaction, Soperation, Sinternal, Scomponent). For this example, the event would be categorized as an "internal" event (internal to the 5ESS-2000 Switch). Scheck_type would detect the input that indicated an "internal" event in the IR and would transition to the third level of the "upper" machine 410 to the Sinternal state.

The states defined in Level 3 of the "upper" machine 410 check for the unique input that was defined for this event. The next state transition to Level 4, is done based on this unique input. This example would transition to the state ScQuery_Ev.

The states at Level 4 all begin with "Sc". The "S" indicates that it is a state, and the "c" indicates that this is a "check" state. It is at this level that the CS-1 state is checked to determine if this event can be processed for the current CS-1 state. This is done by looking for the presence of the inputs in the Input Register corresponding to the CS-1 states. FIG. 4 only shows some of the states at Level 4, but the 5ESS-2000 FSM 400 does operate in all standard states.

If the event can be processed in the current CS-1 state, then Level 5 is entered. In this example, state SQuery Ev would be entered. The states at Level 5 actually do the processing of the incoming event. Again, FIG. 4 only shows some of the states at Level 5. To continue this example, in the state SQuery_Ev, the outputs would map to the real world behavior of sending a TCAP message with the Initial DP operation to the SCP. In the normal case, when no errors are detected, the next state transition would be to Level 6 of the "upper" machine 410 to the state S_cs1_state_check.

Level 6 of the "upper" machine 410 is also Level I of the "lower" machine 440. In the state S_cs1_state_check, the input in the Input Register that indicates the CS-1 state is checked. In this case, Idle would be in the Input Register. This condition would cause a state transition to Level 2 of the "lower" machine 440 to the state Sidle_state_check.

Level 2 states of the "lower" machine 440 are the states that check to see if the conditions exist which would cause a CS-1 state transition as defined in ETS 300 374-1. In this example, the SSP has sent the SCP a TCAP message with an Initial DP operation. This is a condition that would cause a CS-1 state change to the Waiting For Instructions state. Therefore, the transition to the state S_winst_cs1_state at Level 3 of the "lower" machine 440 would occur.

The states defined at Level 3 of the "lower" machine 440 send feedback events that put the new CS-1 state inputs into the IR. In this example, the input Iwinst would be placed in the IR. All CS-1 inputs are defined with the same class. Therefore, in this example, Idle would be removed from the IR when Iwinst was inserted into the IR. An IR for the ETSI INAP FSM is saved and used throughout the processing of events for any particular call. This means that in this example, when the next event is processed for this call, and the Start state is entered, Iwinst will be in the IR.

The last level defined in the "lower" machine 440 is Level 4 and consists of the Send state. This state transition is always done upon completion of the processing of an event. "Upper" machine 410 and "lower" machine 440 working together provide all the states of ETSI INAP capability set 1.

Thus, it will now be understood that there has been disclosed a new method and apparatus for providing a finite state machine implementing the ETSI INAP protocol. While the invention has been particularly illustrated and described with reference to preferred embodiments thereof, it will be understood by those skilled in the art that various changes in form, details, and applications may be made therein. For example, the finite state machine could be implemented as a virtual finite state machine having a virtual input register. It is accordingly intended that the appended claims shall cover all such changes in form, details and applications which do not depart from the true spirit and scope of the invention.

Glossary of Terms Used in the Specification
5ESS—5th Electronic Switching System
CCF—Call Control Function
CS—Capability Set 1
ETSI—European Telecommunications Standards Institute
FE—Functional Entity
FSM—Finite State Machine
IN—Intelligent Network
INAP—Intelligent Network Application Protocol
IP—Intelligent Peripheral
IR—Input Register
ITU—International Telecommunications Union
LAP-D—Linked Access Protocol on the D-Channel
MACF—Multiple Association Control Function
MTP—Message Transfer Part
PE—Physical Entity PSTN—Public Switched Telecommunications Network
ROSE—Remote Operations Service Element
SACF—Single Association Control Function
SCCP—Signaling Connection Control Part
SCE—Service Creation Environment
SCF—Service Control Function
SCP—Service Control Point
SMS—Service Management System
SRF—Specialized Resource Function
SS7—Signaling System No. 7
SSF—Service Switching Function
SSP—Service Switching Point
TCAP—Transaction Capabilities Application Part
VFSM—Virtual Finite State Machine
VIR—Virtual Input Register

What is claimed is:

1. A hierarchical finite state machine that provides integrated control of an input condition of an input register subsequent to determining a state of an output register, the hierarchical finite state machine comprising a first finite state machine (410) including said input register, characterized by:

the first state machine (410) having a common register (level 6 of 410, level 1 of 440) having a state which depends on the input condition of said input register;

a second finite state machine (440) connected to said first finite state machine (410), the common register comprising outcome results of the first state machine and serving as an input to the second finite state machine (440);

the second finite state machine (440) determining the state of the output register (Send) following the first finite state machine determining the outcome result of the common register; and the second finite state machine changing the input condition of said input register of the first state machine if the state of the common register is validated by a predetermined set of rules (levels 2,3 of 440) implemented by the second finite state machine (440), thereby readying the first state machine (410) to process new information consistent with a previously determined state of the output register (Send).

2. The finite state machine of claim 1, further comprising:

said first and second finite state machine each being a virtual finite state machine implemented with VFSM technology; and a processor for sequencing said virtual finite state machines.

3. The finite state machine of claim 1, wherein:

said first and second finite state machines implement ETSI INAP capability set 1 intelligent network application protocol.

4. The finite state machine of claim 1, wherein the states in the first finite state machine are cohesive and are de-coupled from the other states.

5. A method for providing integrated control of an input condition of an input register subsequent to determining a state of an output register in a hierarchical finite state machine, the method including the step of utilizing an input register of a first finite state machine (410), the method characterized by the steps of:

sharing the state of a common register (level 6 of 410, level 1 of 440) between the first state machine (410) and the second state machine (440), the state of the common register depending on the input condition of said input register;

the common register containing outcome results as determined by the first state machine and serving as an input to the second finite state machine (440);

following the first finite state machine determining the outcome result of the common register, the second finite state machine (440) determining the state of the output register (Send); and changing, by the second finite state machine, the input condition of said input register of the first state machine if the state of the common register is validated by a predetermined set of rules (levels 2,3 of 440) implemented by the second finite state machine (440), thereby readying the first state machine (410) to process new information consistent with a previously determined state of the output register (Send).

6. The method of claim 5 further comprising implementing said first and second finite state machine each by a virtual finite state machine implemented with VFSM technology; and using a processor for sequencing said virtual finite state machines.

7. The method of claim 5 wherein said first and second finite state machines implement ETSI INAP capability set 1 intelligent network application protocol.

8. The method of claim 5 wherein the states in the first finite state machine are cohesive and are de-coupled from the other states.

* * * * *